(12) United States Patent
Ikeda et al.

(10) Patent No.: US 7,194,169 B2
(45) Date of Patent: Mar. 20, 2007

(54) NOTCHED ADJUSTABLE APERTURE

(75) Inventors: Roger M. Ikeda, Plano, TX (US); Steven M. Penn, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/748,952

(22) Filed: Dec. 30, 2003

(65) Prior Publication Data

US 2005/0147364 A1 Jul. 7, 2005

(51) Int. Cl.
*G02B 6/04* (2006.01)
(52) U.S. Cl. .............. 385/115; 385/116; 385/120; 382/168; 353/88
(58) Field of Classification Search ........ 385/115, 385/116, 119, 120, 121; 382/168, 312; 355/43; 362/277, 319; 353/88, 97; 345/108, 204
See application file for complete search history.

(56) References Cited

U.S. PATENT DOCUMENTS 5,442,414 A   8/1995  Janssen et al. ............ 353/98
2002/0126264 A1  9/2002  Dewald et al. ............ 353/97
2005/0146520 A1*  7/2005  Ikeda ........................ 345/204
2005/0156871 A1*  7/2005  Ikeda ........................ 345/108

OTHER PUBLICATIONS

L.J. Hornbeck, "Digital Light Processing™: A New MEMS-Based Display Technology," Texas Instruments, white paper, 22 pages.
G. Hewlett and W. Werner, "Analysis of Electronic Cinema Projection with the Texas Instruments Digital Micromirror Device™ Display System," Texas Instruments, white paper, 10 pages.
S.M. Penn, et al., "Adaptive Illumination Modulator," U.S. Appl. No. 10/326,237, currently pending, Dec. 20, 2003.

* cited by examiner

*Primary Examiner*—Phan T. H. Palmer
(74) *Attorney, Agent, or Firm*—Charles A. Brill; Wade James Brady, III; Frederick J. Telecky, Jr.

(57) ABSTRACT

An adjustable aperture system includes a stationary aperture operable to remove a portion of a lower intensity light communicated through a light bundle. The system also includes an adjustable aperture comprising a notch and capable of varying an amount of projection light communicated through the light bundle. In one particular embodiment, the notch operates to reduce the effect of the adjustable aperture on a high intensity light communicated through the light bundle. The system further includes a control motor operable to receive a control signal and to selectively manipulate the adjustable aperture.

20 Claims, 6 Drawing Sheets

NOTCHED ADJUSTABLE APERTURE

RELATED APPLICATIONS

This application is related to application Ser. No. 10/749,029, entitled "COLOR ADJUSTMENT FOR CLIPPED PIXELS," filed Dec. 30, 2003; and to application Ser. No. 10/748,950, entitled "AUTOMATIC GAIN CONTROL FOR IMAGE DISPLAY SYSTEMS," filed Dec. 30, 2003.

TECHNICAL FIELD OF THE INVENTION

This invention relates in general to image display system, and more particularly to optical systems implementing micro-mirror based projection display systems.

OVERVIEW

Spatial light modulators used in projection display systems are capable of projecting image details from media sources such as HDTV, DVD, and DVI. Conventional spatial light modulators are limited in their ability to reduce the brightness associated with modulate light at frequencies for sufficient grayscale resolution at high contrast ratios. Inadequate grayscale resolution can prevent smooth shades of color intensity, resulting in objectionable contour lines at the transition between one area of brightness and an adjacent area of slightly different brightness.

SUMMARY OF EXAMPLE EMBODIMENTS

In one embodiment, an adjustable aperture system comprises a stationary aperture operable to remove a portion of a lower intensity light communicated through a light bundle. The system also comprises an adjustable aperture comprising a notch and capable of varying an amount of projection light communicated through the light bundle. In one particular embodiment, the notch operates to reduce the effect of the adjustable aperture on a high intensity light communicated through the light bundle. The system further comprises a control motor operable to receive a control signal and to selectively manipulate the adjustable aperture.

In another embodiment, an image display system comprises a modulator operable to selectively communicate a projection light beam along a projection light path. The system further comprises at least one adjustable aperture positioned in the projection light path and operable to selectively vary an amount of the projection light beam communicated from the modulator. The adjustable aperture comprising a notch that operates to reduce the effect of the adjustable aperture on a high intensity light associated with the projection light beam. In one particular embodiment, the notch communicates at least a majority of the high intensity light associated with the projection light beam.

Depending on the specific features implemented, particular embodiments of the present invention may exhibit some, none, or all of the following technical advantages. Various embodiments may be capable of lowering the black level associated with a signal. Some embodiments may be capable of determining a gain associated with a signal based at least in part on a target aperture position. Other embodiments may be capable of correcting the hue of a clipped pixel after amplification of a signal.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF EXAMPLE EMBODIMENTS

Figure 1:
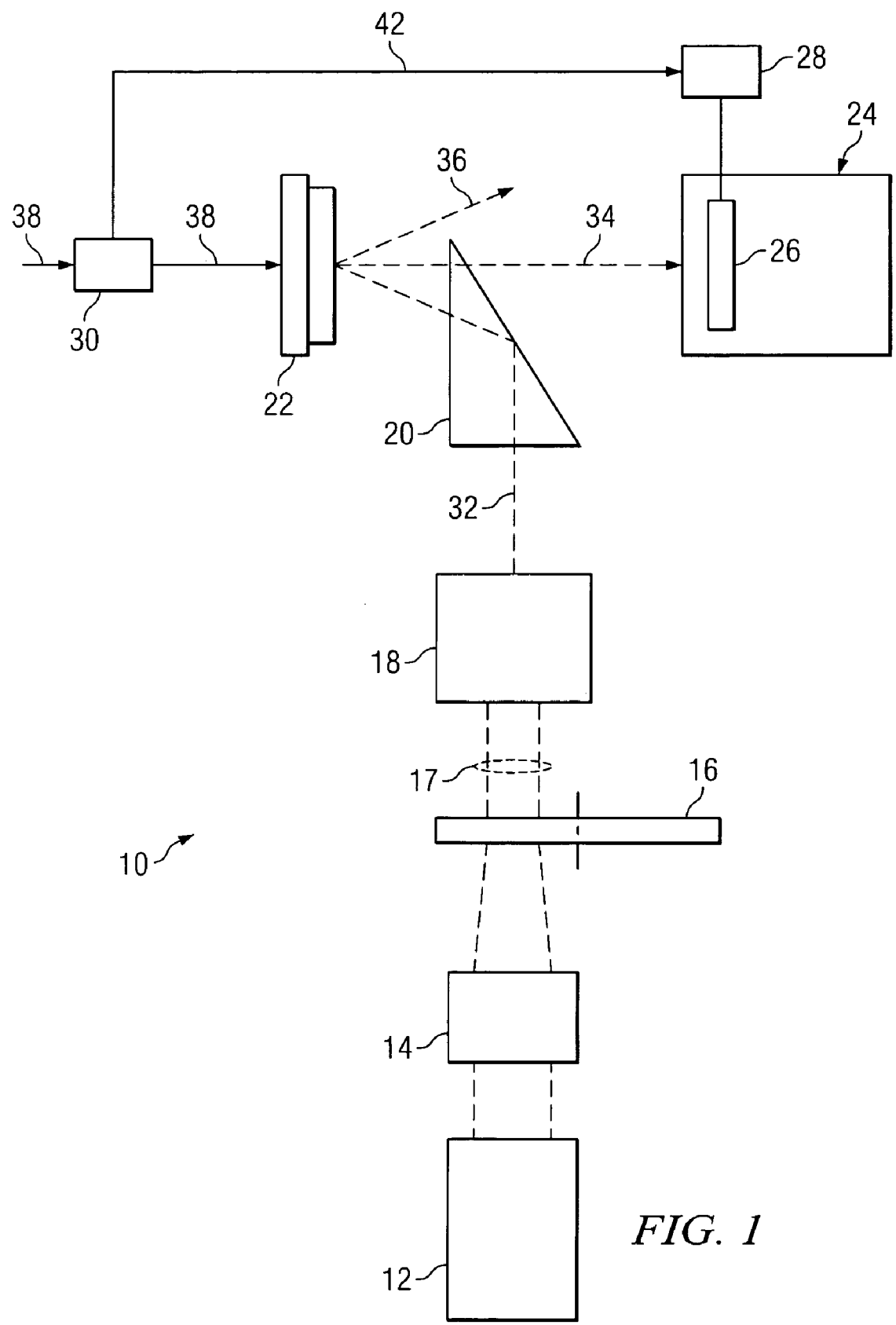
FIG. 1 is a block diagram of one embodiment of a portion of a projection display system implementing an adjustable aperture.

FIG. 1 is a block diagram of one embodiment of a portion of a projection display system 10 implementing an adjustable aperture 26. In this example, projection display system 10 includes a light source 12 capable of generating an illumination light beam and a first optics group 14 capable of focusing the illumination light beam on an entrance pupil of an integration rod 17. Light source 12 may comprise any light source, such as, for example, a metal halide light source or a xenon arc light source. First optics group 14 may comprise a condenser lens and/or any other suitable optical device.

In this particular embodiment, the illumination light beam passes through a color wheel 16 before entering integration rod 17. Color wheel 16 may comprise any device capable of modulating one of the primary colors (e.g., red, green, and blue), in the path of the illumination light beam. For example, color wheel 16 may comprise a scrolling color wheel or other type of recycling color wheel. Color wheel 16 enables the illumination light beam to be filtered so as to provide "field sequential" images. Color wheel 16 enables system 10 to generate a sequence of differently colored images that are perceived by a viewer through a projection lens 24 as a correctly colored image.

In this example, system 10 also includes a second optics group 18 capable of receiving the illumination light beam passing through integration rod 17 and capable of focusing the illumination light beam onto a modulator 22 through a prism assembly 20. Second optics group 18 may comprise, for example, a condenser lens and/or any other suitable optical device. Modulator 22 may comprise any device capable of selectively communicating at least some of the illumination light beam along a projection light path 34 and/or along an off state light path 36. In various embodiments, modulator 22 may comprise a spatial light modulator, such as, for example, a liquid crystal display or a light emitting diode modulator.

In this particular embodiment, modulator 22 comprises a digital micro-mirror device (DMD). The DMD is a micro electro-mechanical device comprising an array of hundreds of thousands of tilting micro-mirrors. Each micro-mirror may tilt, for example, plus or minus ten degrees for the active "on" state or "off" state. To permit the micro-mirrors to tilt, each micro-mirror attaches to one or more hinges mounted on support posts, and spaced by means of an air gap over underlying control circuitry. The control circuitry provides electrostatic forces, based at least in part on image data 38 received from a control module 30. In this particular embodiment, modulator 22 is capable of generating approximately 256 levels or shades for each color received. In this example, color level "0" represents the darkest shade and color level "255" represents the brightest shade.

The electrostatic forces cause each micro-mirror to selectively tilt. Incident illumination light on the micro-mirror array is reflected by the "on" micro-mirrors along projection path 34 for receipt by projection lens 24 and is reflected by the "off" micro-mirrors along off state light path 36 for receipt by a light dump. The pattern of "on" versus "off" mirrors (e.g., light and dark mirrors) forms an image that is projected by projection lens 24. As used in this document, the terms "micro-mirrors" and "pixels" are used interchangeably.

In this particular embodiment, display system 10 includes at least one adjustable aperture 26. In this example, system 10 positions adjustable aperture 26 within projection lens 24 at a projection pupil or projection "stop". In other embodiments, system 10 can position adjustable aperture 26 at any point along projection path 34. In various embodiments, adjustable aperture 26 can be designed or controlled to ensure that a minimum amount of the projection light is used to form an image projected by projection lens 24. In some cases, the minimum amount of projection light can comprise, for example, between fifteen and thirty percent of the total light communicated along projection path 34. In one particular embodiment, adjustable aperture 26 comprises a notched aperture that is capable of minimizing impingement upon the highest intensity projection light communicated along projection path 34. In most cases, the high intensity light is located around the center of a light bundle.

In this particular example, adjustable aperture 26 selectively varies the amount of projection light transmitted along projection path 34. That is, adjustable aperture 26 operates to supplement the modulation function of modulator 22 by selectively varying the amount of projection light communicated from modulator 22. Varying the amount of projection light communicated from modulator 22 can advantageously adjust brightness and/or contrast of the projected image. For example, for a bright scene, adjustable aperture 26 can operate (e.g., open) to make optimal use of the available amount of the projection light communicated from modulator 22. Likewise, for darker scenes, aperture 26 can operate (e.g., close) to proportionally reduce the amount of the "on" state light communicated from modulator 22 and to increase the contrast ratio of the projected image. In some cases, aperture 26 can vary the brightness and contrast of the projected image on a frame-by-frame or a multiple frame basis.

One aspect of this disclosure recognizes that selectively varying the amount of projection light communicated from modulator 22 can reduce gray-level contour artifacts by providing additional levels of grayscale intensity. Moreover, selectively varying the amount of projection light communicated from modulator 22 can improve the contrast ratio of system 10 by reducing the black level associated with an image communicated from modulator 22. The term "black level" refers to the light level when the micro-mirrors or pixels are in the "off" state position.

In various embodiments, adjustable aperture 26 can selectively vary the intensity of the projection light based on image data 38 and/or an ambient room environment. In most cases, aperture 26 can selectively vary the amount of projection light on a frame-by-frame basis. The term "frame" refers to a complete image displayed by the spatial light modulator and represented by a set of display data. Image data 38 may comprise, for example, an image content, a color content, an integrated intensity of the image frame, a peak to peak intensity value of the image frame, and/or a subjectively weighted area, such as the center of the image. In some embodiments, image data 38 can comprise data compiled from analyzed histogram data.

In other embodiments, adjustable aperture 26 can selectively vary the intensity of the projection light while maintaining a relatively constant contrast. In other words, aperture 26 can lower or raise both the lowest gray-scale level and the highest gray-scale level, while maintaining a desired separation (e.g., contrast) between the highest and lowest gray-scale levels.

In still other embodiments, adjustable aperture 26 can operate to selectively vary the amount of projection light communicated from modulator 22 at a frequency that can be faster than the modulation cycle or pulse time of modulator 22. Modulating aperture 26 at a rate faster than a modulation rate of modulator 22 advantageously enables system 10 to enhance further the brightness and/or contrast of a projected image.

In this example, system 10 includes control module 30 capable of controlling the position of aperture 26. Control module 30 operates to control the position of adjustable aperture 26 based at least in part on image data 38 received from a communication device (not explicitly shown). In this particular embodiment, control module 30 generates a control signal 42 according to an image intensity algorithm that analyzes image data 38 received from the communication device.

In this example, a control motor 28 receives control signal 42 and selectively manipulates adjustable aperture 26 to vary the amount of projection light transmitted along projection path 34. In this example, control motor 28 comprises a trapezoidal voice coil motor. In other embodiments, control motor 28 may comprise, for example, a fast-acting linear actuator, a galvanometer type actuator, or a rotary actuator. In this particular embodiment, control motor 28 is capable of 256 step changes. In other embodiments, control motor 28 may be capable of 128 step changes. In various embodiments, control motor 28 at maximum speed can step 128 steps in 16 milliseconds or less.

In this particular embodiment, control module 30 includes a histogram that collects data associated with image data 38 and determines a target aperture position of aperture 26 based at least in part on the histogram. The histogram operates to tally or count the number of pixels, for each frame, having their maximum intensity component (e.g., the red, green, or blue component) at a particular color level (e.g., 0–255). In some cases, the image intensity algorithm determines an appropriate "step size" for aperture 26 based at least in part on the target aperture position and the actual position of aperture 26. As used in the document, the term "step size" refers to the speed at which aperture 26 moves toward its target aperture position. In most cases, the smaller the "step size" the slower aperture 26 moves toward its target aperture position.

In other embodiments, control module 30 determines the target aperture position based on the histogram and a maximum number of pixels a manufacturer is willing to clip. The term "clip" and "clipped" refers to a pixel or micro-mirror having a color value that exceeds the maximum color level (e.g., 255) after amplification of the image data. In various embodiments, system manufacturers can set the maximum number of clipped pixels to, for example, ¼ or ½ of one percent of the total number of pixels associated with modulator 22. In some cases, a system manufacturer can set the maximum number of clipped pixels to between 2,000 and 6,000 pixels. In this particular example, the maximum number of clipped pixels is set to 4096.

Control module 30 determines the target aperture position by counting, starting in bin "31," the number of pixels until control module 30 determines the bin that contains the pixel equaling the maximum number of clipped pixels. For example, if the maximum number of clipped pixels is set to 2048 and bin "31" has 500 pixels, bin "30" has 500 pixels, bin "29" has 800 pixels, and bin "28" has 600 pixels, then control module 30 determines that bin "28" has the 2048$^{th}$ pixel. In that case, control module 30 sets the target aperture to the aperture position associated with bin "28" to ensure that the maximum number of clipped pixels is not exceeded. As used in this document, the term "bin" refers to any suitable storage medium or memory.

In this example, control module 30 is capable of amplifying image data 38 before communicating image data 38 to modulator 22. In this particular embodiment, control module 30 determines the amount of gain to apply to image data 38 according to the image intensity algorithm that controls the position of aperture 26. In some cases, the image intensity algorithm determines a new aperture position based at least in part on a target aperture position and a "step size" for aperture 26. The image intensity algorithm then determines an appropriate gain to apply to image data 38 based at least in part on the new aperture position of aperture 26.

One aspect of this disclosure recognizes that by amplifying image data 38 and controlling the position of aperture 26, system 10 can increase the number of effective color levels associated with modulator 22. For example, if the image intensity algorithm positions aperture 26 such that aperture 26 reduces the projection light by 75% and, as a result, applies a gain of four to image data 38, then system 10 can use approximately four times as many levels to reproduce the scene. Controlling the position of aperture 26 and amplifying image data 38 is particularly advantageous for darker color levels (e.g., levels 0–127). Moreover, amplifying image data 38 and selectively varying the amount of projection light communicated from modulator 22 can improve the contrast ratio of system 10 by reducing the black level associated with an image communicated from modulator 22.

In other embodiments, control module 30 can adjust the color of a clipped pixel associated with image data 38 after amplification by applying a hue correction algorithm before communicating image data 38 to modulator 22. In most cases, a clipped pixel will result in a color having a substantially different hue and, as a result, a different color. In one example, image data 38 may desire to project a gray-blue color (e.g., a red level of 128, a green level of 128, and a blue level of 255) for a particular pixel. In that example, if control module 30 applies a gain of two, the projected color will be a white color (e.g., each of the red, green, and blue levels will have a value of 255). To minimize the impact of clipped pixels, control module 30 implements a hue correction algorithm that ensures system 10 maintains the amplified image data 38 associated with the clipped pixel in the desired hue.

One aspect of this disclosure recognizes that applying a hue correction algorithm to the clipped pixels can result in an improved image displayed or projected from system 10. That is, the hue correction algorithm allows the clipped pixels to have a relatively natural look, when compared to the rest of the projected image, instead of the highly desaturated look that results from clipped pixels. Although the hue correction algorithm is applied within system 10 in this example, the hue correction algorithm disclosed herein may be applicable to any system having an adjustable contrast.

In this particular embodiment, system 10 includes at least one adjustable aperture 26 positioned along projection path 34. In various embodiments, system 10 can exclude adjustable aperture 26 and include at least one adjustable illumination aperture (not explicitly shown) located at any point along illumination path 32, preferably located at the illumination stop of integration rod 17. The structure and function of the adjustable illumination aperture can be substantially similar to adjustable aperture 26. In other embodiments, system 10 can include both an adjustable aperture 26 and an adjustable illumination aperture. Where system 10 implements both adjustable aperture 26 and the adjustable illumination aperture, it can be advantageous to match the size and the shape of the illumination aperture with the size and shape of adjustable projection aperture 26.

Figure 2:
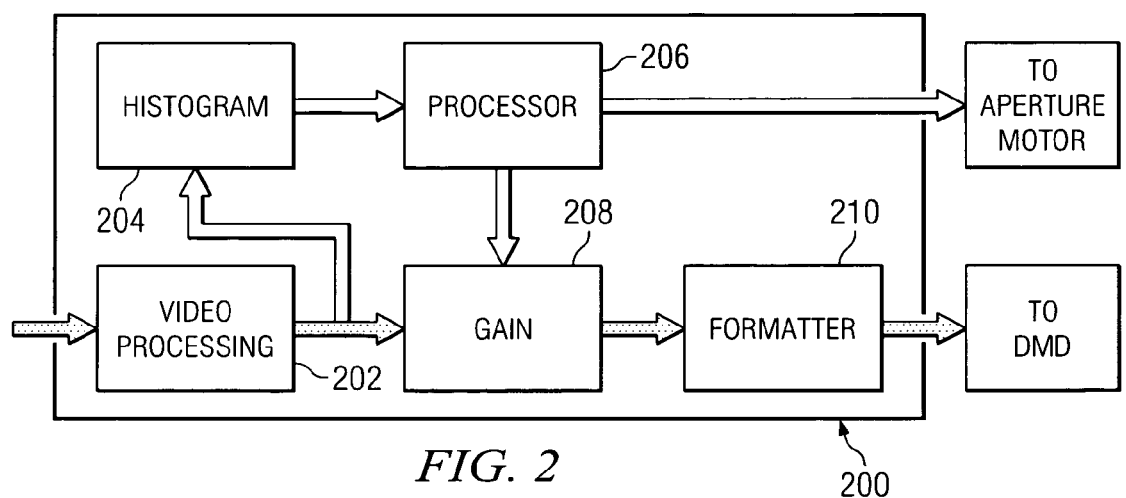
FIG. 2 is a block diagram of a control module capable of adjusting a position of an adjustable aperture and of determining a desired gain for image data.

FIG. 2 is a block diagram of a control module 200 capable of adjusting a position of an adjustable aperture and of determining a desired gain for image data. In various embodiments, the structure and function of control module 200 can be substantially similar to control module 30 of FIG. 1. In this example, control module 200 includes a video processing module 202 capable of processing (e.g., converting the signal to red, green, and blue) a digital signal received from a communication source. Video processing module 202 may also be capable of converting the input signal to a linear scale for use by other modules within control module 200. In other embodiments, video processing module 202 may have access to or include a decoding module capable of decoding a digital signal before processing. In some embodiments, video processing module 202 may have access to or include a decoding module capable of converting an analog signal to digital format. In this particular embodiment, processing module 202 operates to process the received signal on a frame-by-frame basis.

Video processing module 202 communicates the processed signal to a histogram module 204. Histogram module 204 operates to tally or count the number of pixels, for each frame associated with the processed signal, having their maximum intensity component (e.g., the red, green, or blue component) at a particular color level (e.g., 0–255). In this example, histogram module 204 comprises 32 bins, each capable of counting the number of pixels associated with particular color levels. That is, each bin of the histogram operates to tally or count the maximum intensity component (e.g., red, green, or blue component) of each pixel associated with a particular frame of the processed signal. For example, bin "0" of a histogram operates to count the pixels having their maximum intensity component at a level between 0 and 7, while bin "31" operates to count the pixels having their maximum intensity components at a level between 248 and 255. In that example, bin "0" operates to count the number of dark pixels and bin "31" operates to count the number of bright pixels within the desired color level range. Although histogram module 204 implements thirty-two bins in this example, any desired number of bins may be used without departing from the scope of the present disclosure.

Control module 200 also includes a processor 206 having access to histogram module 204. Processor 206 also includes or has access to a memory capable of storing at least a target aperture position table, an aperture position to gain table, a current background bin number, and a prior background bin number. In some cases, the memory is capable of storing data associated with an image intensity algorithm. For example, the memory can store values associated with a maximum number of clipped pixels, a target background pixel, "step sizes" associated with different conditions, a large movement threshold, a large bin change threshold, a large number of dark pixels threshold, and other values.

In this particular embodiment, processor 206 determines a target aperture position based on the data collected by histogram module 204 and a maximum number of pixels a manufacturer is willing to clip. In various embodiments, system manufacturers can set the maximum number of clipped pixels to, for example, ¼ or ½ of one percent of the total number of pixels associated with modulator 22. In this particular example, the maximum number of clipped pixels is the $2048^{th}$ pixel. Processor 206 determines the target aperture position by first counting, starting in bin "31," the number of pixels until processor 206 determines the bin that contains the pixel equaling the maximum number of clipped pixels. For example, if the maximum number of clipped pixels is set to 4096 and bin "31" has 800 pixels, bin "30" has 800 pixels, bin "29" has 1000 pixels, bin "28" has 1100 pixels, and bin "27" has 4000 pixels, then processor 206 determines that bin "27" has the $4096^{th}$ pixel. In that case, processor 206 sets the target bin to the aperture position associated with bin "27" to ensure that the maximum number of clipped pixels is not exceeded.

In this example, processor 206, using the target bin value, accesses to a target aperture position table to determine the target aperture position. Table 1 provides one example of a target aperture position table.

TABLE 1

| Target Aperture Position: | | | | | | | |
|---|---|---|---|---|---|---|---|
| 255, | 255, | 255, | 246, | 238, | 230, | 223, | 216, |
| 210, | 204, | 200, | 195, | 190, | 185, | 179, | 173, |
| 167, | 161, | 153, | 144, | 136, | 128, | 120, | 112, |
| 104, | 96, | 87, | 79, | 68, | 55, | 35, | 0, |

Table 1 includes 32 positions, each position corresponding to one of the 32 bins associated with histogram module 204. In this example, position "32" having a value of "0" corresponds to bin "31", position "25" having a value of "104" corresponds to bin "24", and position "24" having a value of "112" corresponds to bin "23". Where processor 206 determines that the target aperture position should be set to the value associated with bin "28", processor 206 accesses the target aperture position table and determines that the target aperture position value is "68".

In this particular embodiment, processor 206 also determines the rate at which the aperture moves based at least in part on the frame content of the current frame and the previous frame. In this example, for each frame processed by control module 200, processor 206 determines and stores a current background bin value and a prior background bin value. In most cases, device manufacturers determine a pixel value to set as the background pixel. In some cases, the background pixel value can be, for example, the $65,000^{th}$ brightest pixel. In other cases, the background pixel value can be, for example, the $32,000^{th}$ brightest pixel. Processor 206 determines the location of the background pixel within the bins associated with histogram module 204 by counting, starting in bin "31," the number of pixels until processor 206 determines the bin that contains the background pixel value.

After determining the bin that contains the current background pixel, processor 206 compares the current background bin to the preceding frames background bin and determines the appropriate "step size" for the adjustable aperture. If processor 206 determines that the magnitude of the difference between the current and prior background bins is greater than a threshold value, then processor 206 determines that a background change has occurred and a maximum "step size" is appropriate. In some cases, the background bin change threshold value can be, for example, three bins or more.

One aspect of this disclosure recognizes that when processor 206 determines that a background change has occurred, a large aperture movement may not be detectable by a viewer of the scene. A background change typically occurs when the scene associated with the frame changes from dark scene (e.g., an indoor or night scene) to a bright scene (e.g., an outdoor or day scene). Any artifacts caused by the large aperture change typically are obscured to the viewer as the viewer's eye adjusts to the new scene. On the other hand, if the background level is relatively constant, then a large aperture movement would cause a small but visible flicker in brightness and a larger more noticeable change in black level.

In some cases, processor 206 determines that the magnitude of the difference between the current and prior background bins is less than the threshold value. In those cases, processor 206 seeks to minimize the "step sizes" at which aperture moves in either the open or closed direction and determines that a smaller "step size" is appropriate. Selectively varying the aperture by implementing relatively small "step sizes" reduces the potential for a flicker in the brightness associated with the displayed image or scene. In various embodiments, processor 206 can implement small "step sizes" that allow the aperture to reach its target position over several frames (e.g., 120 frames or more). In some cases, this can introduce a penalty in that more pixels may be clipped during the time the aperture takes to reach the target position.

In this particular embodiment, processor 206 also determines an amount of gain to apply to the processed signal received by gain module 208. In various embodiments, gain module 208 can comprise, for example, an amplifier capable of imparting a variable gain to the processed signal. In most cases, the amount of gain applied to the processed signal depends at least in part on the scene content and the maximum number of clipped pixels. In this example, processor 206 determines the amount of gain to apply to the processed signal received by gain module 208 based at least in part on a new aperture position. Processor 206 determines the new aperture by summing the target aperture position and the "step size" for the aperture.

In this example, processor 206 determines the amount of gain to apply to the processed signal by accessing an aperture position to gain table. Table 2 provides one example of an aperture position to gain table.

TABLE 2

Aperture Position to Gain:

| | | | | | | | |
|---|---|---|---|---|---|---|---|
| 2048, | 2049, | 2050, | 2051, | 2052, | 2053, | 2055, | 2056, |
| 2057, | 2058, | 2060, | 2061, | 2063, | 2064, | 2066, | 2068, |
| 2069, | 2071, | 2073, | 2075, | 2077, | 2079, | 2081, | 2083, |
| 2085, | 2087, | 2090, | 2092, | 2094, | 2097, | 2099, | 2102, |
| 2105, | 2107, | 2110, | 2113, | 2116, | 2119, | 2121, | 2124, |
| 2127, | 2130, | 2134, | 2137, | 2140, | 2143, | 2147, | 2151, |
| 2154, | 2158, | 2162, | 2166, | 2171, | 2175, | 2180, | 2185, |
| 2189, | 2195, | 2200, | 2205, | 2210, | 2216, | 2221, | 2227, |
| 2233, | 2239, | 2245, | 2251, | 2258, | 2264, | 2271, | 2278, |
| 2286, | 2293, | 2301, | 2309, | 2318, | 2327, | 2336, | 2346, |
| 2356, | 2366, | 2376, | 2386, | 2397, | 2407, | 2418, | 2428, |
| 2439, | 2450, | 2460, | 2471, | 2482, | 2493, | 2503, | 2514, |
| 2526, | 2537, | 2548, | 2560, | 2572, | 2584, | 2597, | 2610, |
| 2623, | 2636, | 2649, | 2663, | 2677, | 2691, | 2705, | 2719, |
| 2734, | 2748, | 2763, | 2778, | 2793, | 2808, | 2823, | 2838, |
| 2853, | 2869, | 2885, | 2901, | 2917, | 2934, | 2950, | 2967, |
| 2984, | 3002, | 3019, | 3037, | 3055, | 3073, | 3091, | 3110, |
| 3128, | 3146, | 3165, | 3183, | 3201, | 3220, | 3238, | 3257, |
| 3276, | 3295, | 3314, | 3333, | 3352, | 3372, | 3392, | 3412, |
| 3433, | 3454, | 3475, | 3497, | 3520, | 3544, | 3568, | 3594, |
| 3620, | 3648, | 3677, | 3707, | 3739, | 3773, | 3808, | 3844, |
| 3882, | 3920, | 3960, | 4001, | 4044, | 4087, | 4130, | 4175, |
| 4220, | 4266, | 4312, | 4360, | 4409, | 4460, | 4512, | 4567, |
| 4624, | 4683, | 4746, | 4811, | 4881, | 4955, | 5032, | 5114, |
| 5200, | 5290, | 5384, | 5482, | 5584, | 5690, | 5799, | 5913, |
| 6030, | 6151, | 6275, | 6402, | 6532, | 6666, | 6803, | 6942, |
| 7085, | 7230, | 7377, | 7526, | 7677, | 7829, | 7983, | 8138, |
| 8294, | 8453, | 8615, | 8779, | 8947, | 9119, | 9297, | 9480, |
| 9670, | 9868, | 10075, | 10291, | 10517, | 10754, | 11001, | 11259, |
| 11529, | 11811, | 12105, | 12411, | 12731, | 13065, | 13413, | 13774, |
| 14151, | 14542, | 14948, | 15369, | 15805, | 16256, | 16383, | 16383, |
| 16383, | 16383, | 16383, | 16383, | 16383, | 16383, | 16383, | 16383, |

In this example, table 2 includes 256 positions, each position corresponds to an aperture position. To determine the gain associated with a given position, processor 206 divides the value associated with the position by a value of 2048. In one example, processor 206 determines that the new aperture position is 100% open and that position "1" having a value of "2048" corresponds to that aperture position. In that case, processor 206 causes gain module 208 to impart a gain of "1" to the processed signal. In another example, processor 206 determines that the new aperture position is approximately 50% open and that position "174" having a value of "4087" corresponds to that aperture position. In that case, processor 206 causes gain module 208 to impart a gain of "1.995" to the processed signal.

Control module 200 also includes a formatter 210 capable of formatting the amplified signal before communicating the amplified signal to a modulator. In this particular example, processor 206 identifies a number of clipped pixels based at least in part on histogram module 204. In most cases, after amplification, each of the clipped pixels will generate a color that is different from the color that was intended to be displayed. The clipped pixels generate a different color because the clipped pixels typically generate a hue that is substantially different from a hue that was intended. Moreover, the displayed color will be desaturated (e.g., having washed out appearance). To minimize the impact of clipped pixels on a displayed image, formatter 210 implements a hue correction algorithm that ensures the clipped pixels are maintained in the desired hue of the intended color.

In various embodiments, formatter 210 has access to or includes a memory capable of storing a hue correction algorithm. In various embodiments, the hue correction algorithm is capable of correcting the hue of the clipped pixels to its originally intended hue. In those embodiments, the actual color displayed may differ from the intended color because the hue correction algorithm may adjust the saturation to be different than was intended. By correcting the hue and adjusting the saturation, the pixel will produce a portion of the image at or near the same brightness as the remainder of the displayed image. In other embodiments, the hue correction algorithm is capable of returning the hue and the saturation of the clipped pixel to their original values, which displays the exact color intended. By returning the hue and saturation to their original values, the pixel will produce a portion of the image at a brightness that is less than the remainder of the displayed image.

In operation, control module 200 operates to determine the appropriate aperture position and the appropriate gain for a given frame based on the content of the preceding frame. In various embodiments, control module 200 determines the rate at which the aperture moves based at least in part on the frame content of the current frame and the previous frame. In most cases, control module 200 seeks to minimize the "step sizes" at which aperture moves in either the open or closed direction. Moreover, control module 200 seeks to determine the smallest aperture position and the maximum gain without exceeding the maximum number of clipped pixels and without introducing objectionable artifacts. In one example, control module 200 determines that the current frame is brighter than the preceding frame and the gain applied by gain module 208 is too high for the current frame. In that case, processor 206 operates to cause the aperture to open and reduces the gain applied by gain module 208. In another example, control module 200 determines that the current frame is darker than the preceding frame and that the gain applied by gain module 208 is too low for the current frame. In that case, processor 206 operates to cause the aperture to close and increases the gain applied by gain module 208.

Figure 3A:
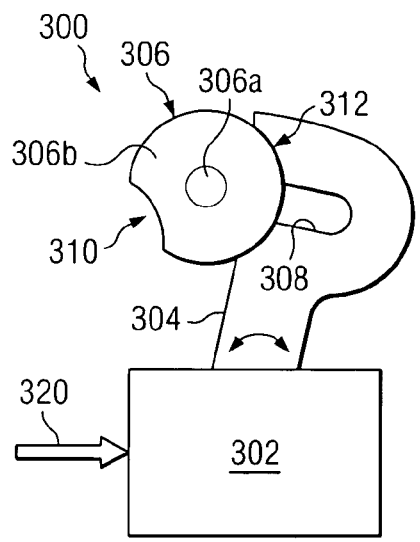
FIGS. 3A and 3B illustrate one example of an aperture system comprising an adjustable aperture.
Figure 3B:
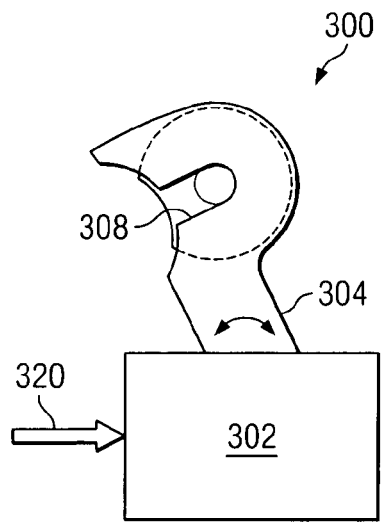

FIGS. 3A and 3B illustrate one example of an aperture system 300 comprising an adjustable aperture 304. In this example, aperture system 300 includes a control motor 302 capable of receive a control signal 320 from a control module (not explicitly shown) and manipulating adjustable aperture 304. The structure and function of control motor 302 can be substantially similar to the structure and function of control motor 28 of FIG. 1. In this example, control motor 302 comprises a trapezoidal voice coil motor that is capable of 256 step changes and is capable, at maximum speed, of transitioning through the 256 steps in approximately 16 milliseconds.

In this example, adjustable aperture 304 operates to manipulate and/or vary an amount of projection light communicated through a light bundle 306. Light bundle 306 includes at least lower intensity light 306b and high intensity light 306a. In particular example, a fixed aperture 310 removes a portion of the lower intensity light 306b associated with light bundle 306. Fixed aperture 310 operates to minimize the impact of off state light when adjustable aperture is in its full closed position (e.g., FIG. 3B).

Adjustable aperture 304 includes a scallop section 312 that is capable of providing a relatively linear response as adjustable aperture 304 transitions through light bundle 306. In this example, a radius associated with scallop section 312 is substantially similar to a radius associated with light bundle 306. In various embodiments, the structure and function of aperture 304 can be substantially similar to adjustable aperture 26 of FIG. 1. In this particular embodiment, adjustable aperture 306 comprises black 30% glass filed Ultem™ (manufactured by General Electric). In other embodiments, adjustable aperture may comprise, for example, anodized aluminum or any other high temperature material coated with a high temperature absorbent material capable of absorbing at least some of the projection light received by aperture system 300.

In this particular embodiment, adjustable aperture 304 includes a notch 308 capable of transmitting high intensity light 306a associated with light bundle 306. As adjustable aperture 304 transitions from its full open position (e.g., FIG. 3A) to its full closed position (e.g., FIG. 3B) notch 308 substantially reduces the likelihood that adjustable aperture 304 will affect or impinge upon high intensity light 306a. Minimizing the affect of adjustable aperture 304 on the high intensity light 306a can result in a higher contrast ratio because high intensity light 306a comprises the highest contrast light associated with light bundle 306. Moreover, minimizing the affect of adjustable aperture 304 on high intensity light 306a can maintain the uniformity of the light displayed on a screen.

Notch 308 also operates to ensure that aperture system 300 is capable of communicating at least a minimum amount of light for displaying an image. In various embodiments, notch 308 is capable of ensuring that aperture system 300 communicates at least 25% of the light associated with light bundle 306. That is, with aperture 304 in its full closed position (e.g., FIG. 3B) notch 308 ensures that aperture system 300 communicates at least 25% of the light associated with light bundle 306.

In this example, aperture system 300 includes one adjustable aperture 304. In an alternative embodiment, aperture system 300 could include two adjustable apertures located symmetrically around light bundle 306. In that example, aperture system would exclude fixed aperture 310.

Figure 4A:
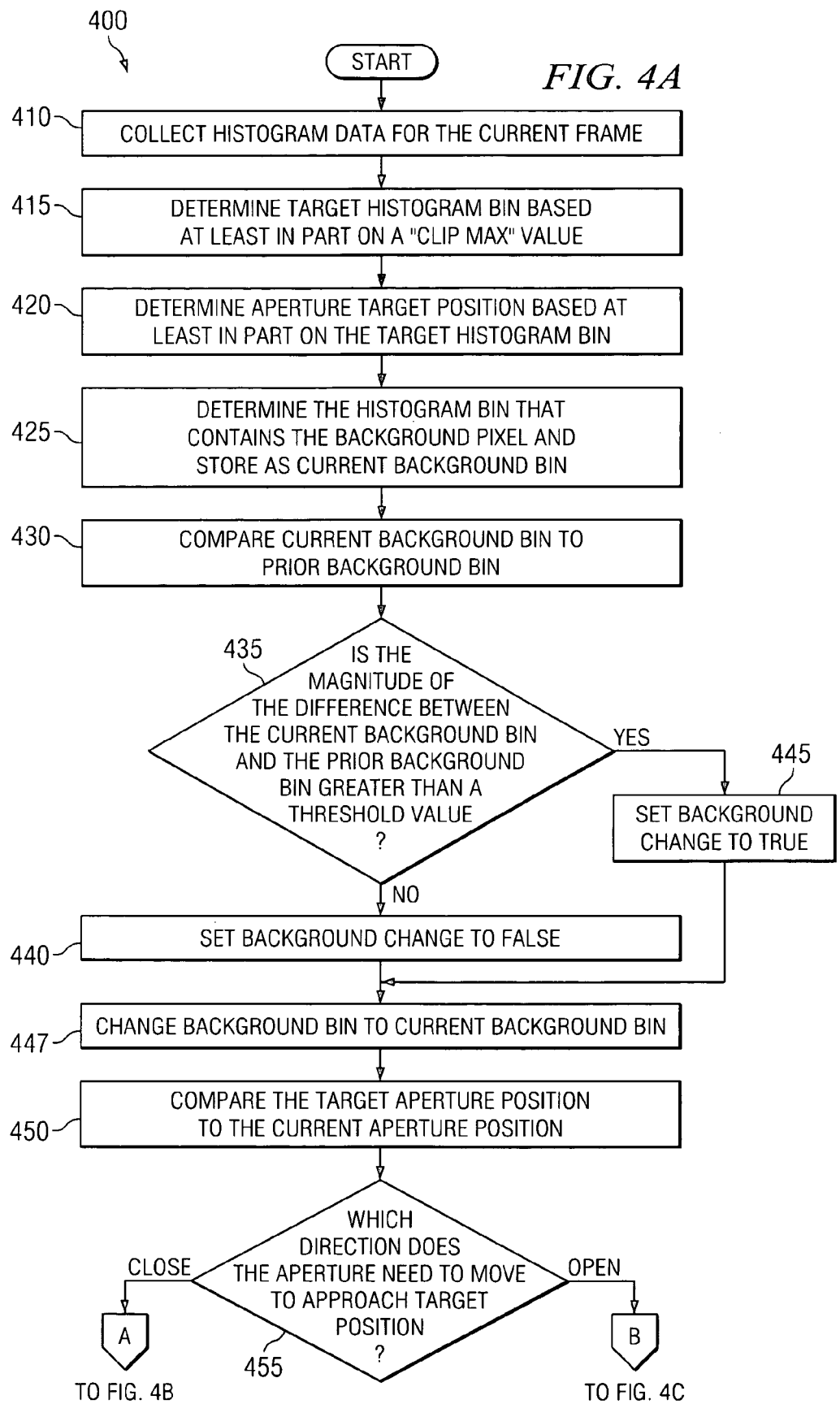
FIG. 4 is a flow chart of a method of adjusting a position of an aperture.
Figure 4B:
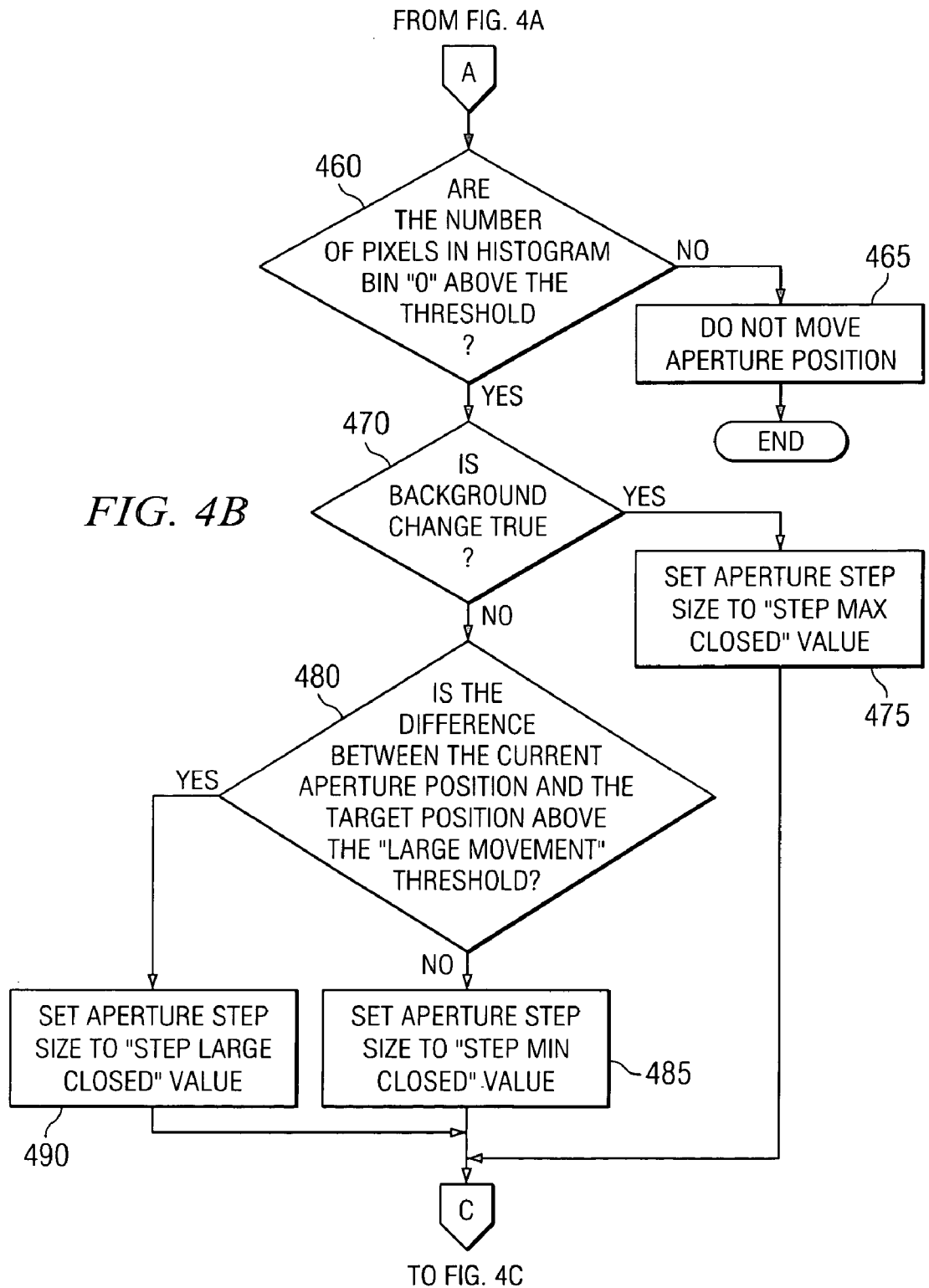
Figure 4C:
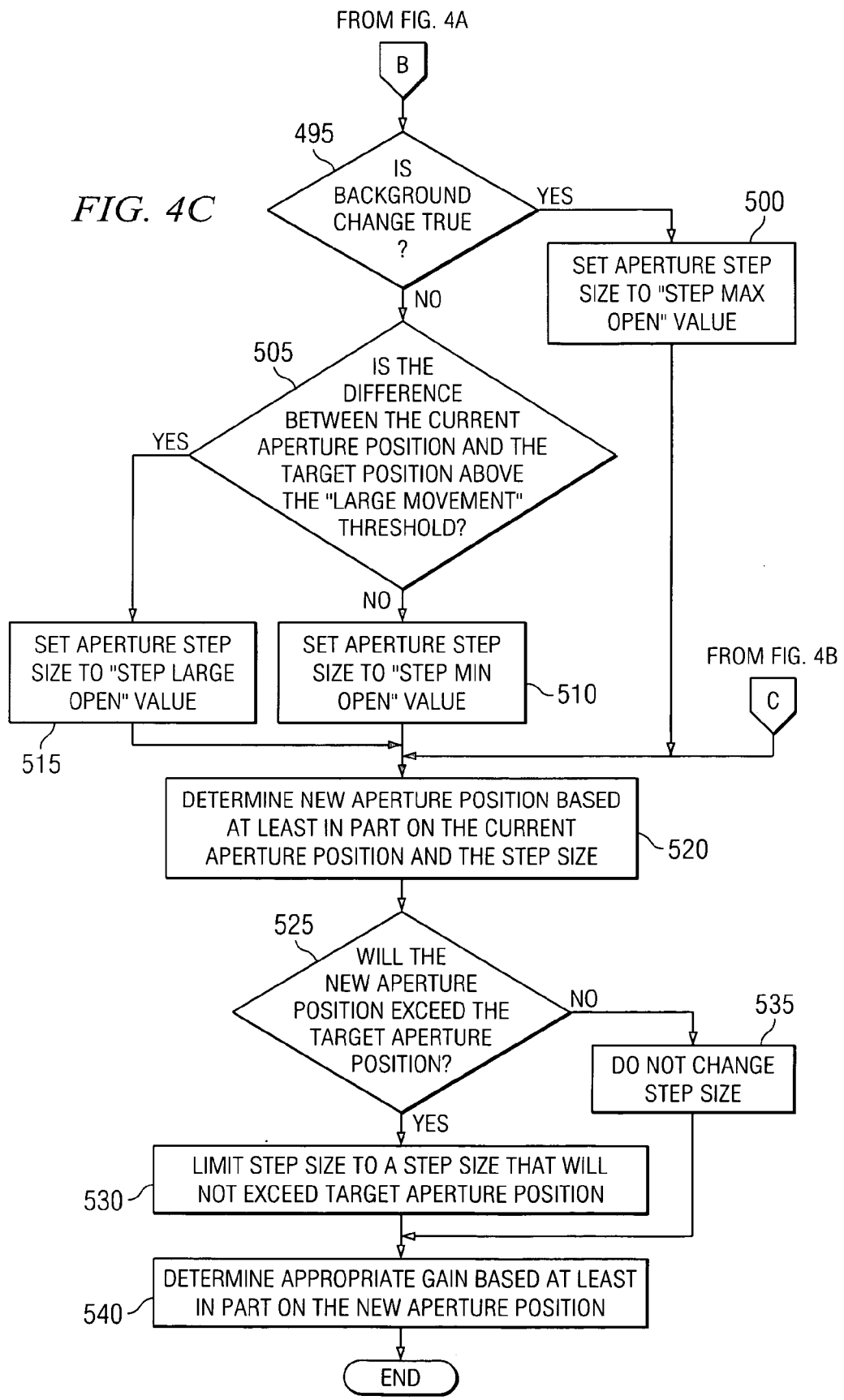

FIG. 4 is a flow chart of one example of a method 400 of adjusting a position of an aperture. In this example, method 400 begins by collecting histogram data for a current frame at block 410. The histogram operates to count the number of pixels of the current frame having their maximum intensity component at a particular color level (e.g., 0–255). In various embodiments, the histogram can comprise thirty-two bins. In this example, bin "31" counts the pixels having the brightest color levels (e.g., 224–255) while bin "0" counts the pixels having the darkest color levels (e.g., 0–31).

After collecting the histogram data for the current frame, method 400 determines a target histogram bin based at least in part on a maximum number of clipped pixels ("clip max") at block 415. In this particular embodiment, the "clip max" value is set such that method 400 will not clip more than 4096 pixels. In this example, method 400 determines the target histogram bin by counting, starting at bin "31", the number of pixels until method 400 determines the bin that contains the pixel equaling "clip max".

In one example, method 400 determines that bin "26" includes the $4096^{th}$ pixel and sets bin "26" as the target histogram bin. Method 400 sets bin "26" as the target histogram bin to minimize the potential for exceeding the "clip max" value. Method 400 then determines an aperture target position based at least in part on the target histogram bin at block 420. In this example, method 400 determines the aperture target position by accessing a target aperture position table. In some cases, the target aperture position table can be substantially similar to table 1.

Method 400 continues by determining the histogram bin that contains the background pixel and stores that bin as the current background bin at block 425. In this particular example, method 400 has set the background pixel value to be the $65,536^{th}$ pixel. In most cases, the current background pixel bin is determined by counting, starting at bin "31", the number of pixels until method 400 determines the bin that contains the background pixel value (e.g., the $65,536^{th}$ pixel).

In this particular example, method 400 compares the current background bin to the prior background bin at block 430. After comparing the current and prior background bins, method 400 determines whether the difference between the current and prior background bins exceed a large bin change threshold that would necessitate a background change at block 435. In this example, the large bin change threshold value is set to four. If the magnitude of the difference between the current and prior background bins is less than or equal to the threshold, method 400 sets a background change parameter to FALSE at block 440. However, if the magnitude of the difference between the current and prior background bins is greater than the threshold, method 400 sets a background change parameter to TRUE at block 445. In either case, method 400 changes the background bin to the current background bin value at block 447.

In this example, method 400 continues by comparing the target aperture position to the current aperture position at block 450. After comparing the target aperture position to the current aperture position, method 400 determines the direction that the aperture needs to move to approach the target position at block 455.

In one particular embodiment, method 400 determines that the target aperture position is greater than the current aperture position so the aperture needs to close. Before generating a close command, method 400 determines whether the number of pixels in histogram bin "0" are above a dark pixel threshold at block 460. In this example, the dark pixel threshold is set to 32,000 pixels. In other embodiments, the dark pixel threshold can comprise, for example, 15,000 pixels. If the number of pixels in bin "0" are below the dark pixel threshold, method 400 prevents the aperture from transitioning toward the target aperture position at block 465.

In this example, if the number of pixels in histogram bin "0" are equal to or above the dark pixel threshold, then method 400 determines whether the background change parameter is set to TRUE at block 470. If method 400 determines that the background change parameter is set to TRUE, then method 400 sets the aperture "step size" to the "step max closed" value at block 475. In most cases, system manufacturers determine the step size associated with "step max closed" based at least in part on the capability of the motor (e.g., motor 28 of FIG. 1) that drives the aperture. In this example, the motor is capable of 256 steps and the "step size" associated with "step max closed" is set to 127 steps.

In this example, if method 400 determines that the background change parameter is set to FALSE, then method 400 determines if the difference between the current aperture position and the target aperture position is above a large movement threshold at block 480. In most cases, system manufacturers determine the large movement threshold. The large movement threshold can be set to, for example, fifty, ninety, one-hundred fifty or more. In this particular example, the large movement threshold is set to one-hundred twenty eight. If method 400 determines that the large movement threshold has not been exceeded, method 400 sets the aperture "step size" to the "step min closed" value at block 485. Otherwise, if method 400 determines that the large movement threshold has been exceeded, method 400 sets the aperture "step size" to the "step large closed" value at block 490. In most cases, system manufacturers determine the step size associated with "step min closed" and "step large closed". In this particular embodiment, "step min closed" is set to a value of one step and "step large closed" is set to a value of two steps.

In one particular embodiment, method 400 determines that the target aperture position is less than the current aperture position so the aperture needs to open. In this example, before generating an open command, method 400 determines whether the background change parameter is set to TRUE at block 495. If method 400 determines that the background change parameter is set to TRUE, then method 400 sets the aperture "step size" to the "step max open" value at block 500. In most cases, system manufacturers determine the step size associated with "step max open" based at least in part on the capability of the motor (e.g., motor 28 of FIG. 1) that drives the aperture. In this example, the motor is capable of 256 steps and the "step size" associated with "step max open" is set to −127 steps or in other words, 127 steps in the opening direction.

In this example, if method 400 determines that the background change parameter is set to FALSE, then method 400 determines if the difference between the current aperture position and the target aperture position is above a large movement threshold at block 505. In most cases, system manufacturers determine the large movement threshold. The large movement threshold can be set to, for example, fifty, ninety, one-hundred fifty or more. In this particular example, the large movement threshold is set to one-hundred twenty eight. If method 400 determines that the large movement threshold has not been exceeded, method 400 sets the aperture "step size" to the "step min open" value at block 510. Otherwise, if method 400 determines that the large movement threshold has been exceeded, method 400 sets the aperture "step size" to the "step large open" value at block 515. In most cases, system manufacturers determine the step size associated with "step min open" and "step large open". In this particular embodiment, "step min open" is set to a value of negative one step and "step large open" is set to a value of negative two steps.

After method 400 determines the appropriate "step size", method 400 determines the new aperture position at block 520. The new aperture position is determined based at least in part on the current aperture position and the "step size" selected at blocks 475, 485, 490, 500, 510, or 515. Method 400 continues by determining whether the new aperture will exceed the target aperture position at block 525. If method 400 determines that the step size is positive and the new aperture position will be greater than the target aperture position, then method 400 limits the "step size" such that the new aperture position will not be greater than the target aperture position at block 530. If method 400 determines that the step size is negative and the new aperture position will be less than the target aperture position, then method 400 limits the "step size" such that the new aperture position will not be less than the target aperture position at block 530. In some cases, the "step size" will be limited to a "step size" that causes the new aperture position to equal the target aperture position. Otherwise, if method 400 determines that the new aperture position will not overshoot the target aperture position, then method 400 does not change the "step size" at block 535. In other words, method 400 implements the "step size" selected at blocks 475, 485, 490, 500, 510, or 515.

Method 400 continues by determining the appropriate gain based at least in part on the new aperture position at block 540. In this example, method 400 determines the gain accessing an aperture position to gain table. In some cases, the aperture position to gain table can be substantially similar to table 2.

Figure 5:
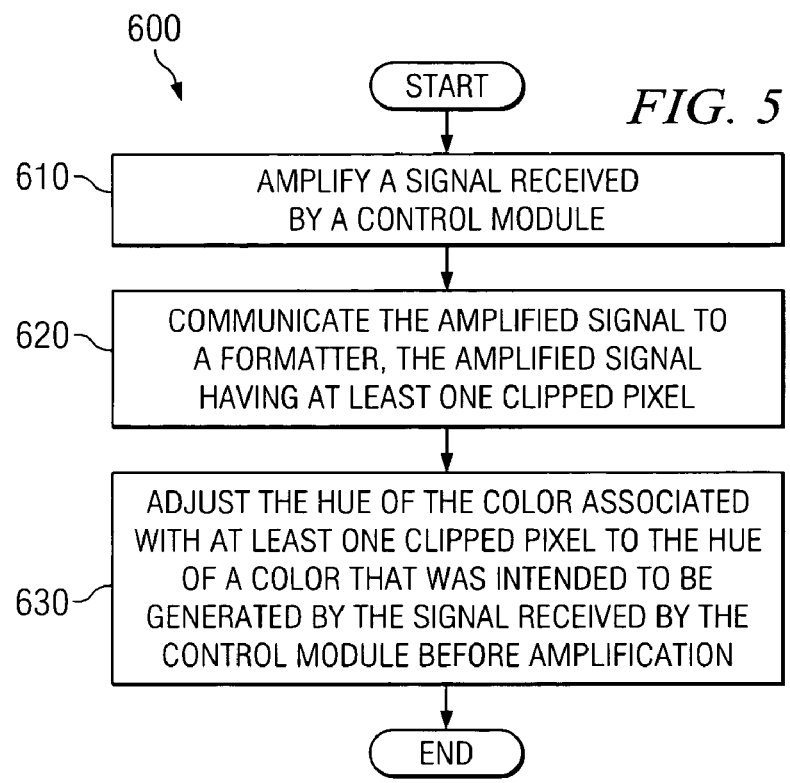
FIG. 5 is a flow chart of a method of correcting a hue of a clipped pixel.

FIG. 5 is a flow chart of a method 600 of correcting a hue of a clipped pixel. In this example, method 600 begins by amplifying a signal received by a control module at block 610. In various embodiments, the structure and function of the control module can be substantially similar to the structure and function of control module 200 of FIG. 2.

After amplifying the received signal, method 600 communicates the amplified signal to a formatter at block 620. In various embodiments, the structure and function of the formatter can be substantially similar to the structure and function of formatter 210 in FIG. 2. In this example, the amplified signal includes at least one clipped pixel. In most cases, the clipped pixel, without hue correction, is capable of generating a color having a hue that is substantially different from a hue of the color that was intended to be generated by the signal. Clipped pixels typically generate a different hue and, consequently, a different color from a color that was intended to be generated by the signal received by the control module.

To minimize the impact of clipped pixels on a displayed image, method 600 adjusts the hue of the color associated with the clipped pixel at block 630. In this example, the formatter adjusts the hue of the clipped pixel to substantially the hue of the color that was intended to be generated by the signal received by the control module before amplification.

In one particular example, the formatter can include or have access to a hue correction algorithm. The hue correction algorithm operates to correct the hue of the clipped pixels to substantially the hue of the color that was intended to be generated by the signal received by the control module before amplification. In those embodiments, the actual color displayed may differ from the intended color because the hue correction algorithm may adjust the saturation to be different than was intended. By correcting the hue and adjusting the saturation, the pixel will produce a portion of the image at or near the same brightness as the remainder of the displayed image. In other embodiments, the hue correction algorithm is capable of returning the hue and the saturation of the clipped pixel to their original values, which displays the exact color intended.

In this particular embodiment, the hue correction algorithm first determines the color levels of the color components (e.g., red, green, or blue) associated with the clipped pixel before the pixel was amplified. The hue correction algorithm then ranks the color components according to their color levels, such that, the color component having the largest color level is assigned the variable $V_1$, the color component having the second largest color level is assigned the variable $V_2$, and the color component having the smallest color level is assigned the variable $V_3$. For example, if the red color component has a level of 252, the green color component has a level of 120, and the blue color component has a level of 80, then the hue correction algorithm assigns the variable $V_1$ to red, $V_2$ to green, and $V_3$ to blue.

After ranking the color components of the clipped pixel, the hue correction algorithm operates to scale the color component having the largest color level before amplification to a maximum color level. The scaled color level having the largest color component before amplification can be determined by:

$$V_{P1} = MIN(V_1, 255) \quad (1)$$

where $V_1$ is the largest color level associated with a color component (e.g., red, green, or blue) the intended color and $V_{P1}$ is the maximum color level that $V_1$ can be set to after amplification.

The hue correction algorithm continues by adjusting the color component having the second largest color level before amplification. The adjusted color level having the second largest color component before amplification can be determined by:

$$V_{P2} = MIN\left(V_2 \frac{V_{P1}}{V_1} + F_{desat} V_3 \left(1 - \frac{V_{P1}}{V_1}\right)\left(\frac{V_1 - V_2}{V_1 - V_3}\right), 255\right) \quad (2)$$

where $V_2$ is the second largest color level associated with the intended color, $V_3$ is the smallest color level associated with the intended color, $V_{P2}$ is the maximum color level that $V_2$ can be set to after amplification to maintain the desired hue, and $F_{desat}$ is an adjustable parameter that varies the saturation of the desired hue.

The hue correction algorithm then adjusts the color component having the smallest color level before amplification. The adjusted color level having the smallest color component before amplification can be determined by:

$$V_{P3} = MIN\left(V_3 \frac{V_{P1}}{V_1} + F_{desat}\left(1 - \frac{V_{P1}}{V_1}\right), 255\right) \quad (3)$$

where $V_{P3}$ is the maximum color level that $V_3$ can be set to after amplification to maintain the desired hue.

In using the above equations, device manufacturers can correct the hue to a hue that is substantially similar to the originally intended hue and can vary the saturation (e.g., by adjusting $F_{desat}$) of the color to achieve a desired result. Device manufacturers can set the variable $F_{desat}$ to a value, for example, between zero and one. The smaller the value associated with $F_{desat}$ the closer the displayed color is to its intended color. The larger the value associated with $F_{desat}$ the more "washed out" the displayed color appears, although in the same hue.

Figure 6:
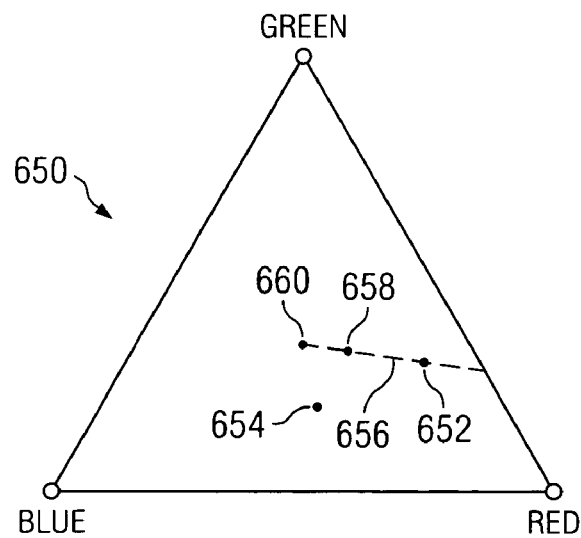
FIG. 6 is a color triangle that illustrates one example of correcting a hue of a clipped pixel.

FIG. 6 is a color triangle 650 that illustrates one example of how a hue correction algorithm can correct a hue associated with a clipped pixel. In this example, color triangle 650 comprises the primary color components of blue, red, and green. In addition, a center 660 of color triangle represents the color white. The boundaries or sides of color triangle 650 represent colors that are fully saturated. That is, at least the smallest color component associated with an intended color has a value of zero.

In this example, a control module, such as control module 200 of FIG. 2, identifies a plurality of clipped pixels. In most cases, each of the clipped pixels will generate a hue of a color 654 that is different from a hue of a color 652 that was intended to be displayed. Moreover, color 654 displayed from the clipped pixel, without correction, will be desaturated (e.g., closer to center 660) and have a washed out appearance. To minimize the impact of clipped pixels on a displayed image, a hue correction algorithm is applied to the color components associated with the clipped pixel to adjust the hue of color 654 to the hue of color 652.

In this example, the control module applies a hue correction algorithm that adjusts the clipped color 654 to a hue that is substantially similar to the originally intended hue (represented by hue line 656). Implementing a hue correction algorithm can advantageously ensure that the hue of a clipped pixel remains substantially constant. In this particular embodiment, the hue correction algorithm restores the hue to a point along hue-line 656 and reduces the saturation of the originally intended color. In other words, a color 658 displayed by the clipped pixel has the originally intended hue and is displayed at or near the same brightness as the remainder of the displayed image. However, the displayed color 658 appears more washed out or white than intended color 652. In other embodiments, the hue correction algorithm can correct the hue and adjust the saturation level of the clipped color 654 to the intended color 652.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. An adjustable aperture system, comprising:
   a stationary aperture operable to remove a portion of a lower intensity light communicated through a light bundle;
   an adjustable aperture comprising a notch and capable of varying an amount of projection light communicated through the light bundle, wherein the notch operates to reduce the effect of the adjustable aperture on a high intensity light communicated through the light bundle; and
   a control motor operable to receive a control signal and to selectively manipulate the adjustable aperture.

2. The adjustable aperture system of claim 1, wherein the adjustable aperture includes a scallop section that provides a relatively linear response as the adjustable aperture transitions through the light bundle.

3. The adjustable aperture system of claim 2, wherein a radius of the scallop section is substantially similar to a radius associated with the light bundle.

4. The adjustable aperture system of claim 1, wherein the notch operates to communicate at least a minimum amount of projection light through the adjustable aperture when the adjustable aperture is in its full closed position.

5. The adjustable aperture system of claim 4, wherein the minimum amount of light comprises at least twenty-five percent of the projection light communicated through the light bundle.

6. The adjustable aperture system of claim 1, wherein the stationary aperture reduces the effect of off state light communicated through the light bundle on a projected image when the adjustable aperture is in its full closed position.

7. The adjustable aperture system of claim 1, wherein the notch operates to communicate substantially all of a high intensity light communicated through the light bundle.

8. The adjustable aperture system of claim 1, wherein the adjustable aperture comprises a material selected from the group consisting of black 30% glass filed Ultem™ and anodized aluminum.

9. The adjustable aperture system of claim 1, wherein the notch operates to communicate at least a majority of the high intensity light communicated through the light bundle.

10. The adjustable aperture system of claim 1, wherein the control motor comprises a trapezoidal voice coil motor capable of at least 128 step changes and is capable of transitioning through the at least 128 steps in approximately sixteen milliseconds or less.

11. The adjustable aperture system of claim 1, wherein the control motor is selected from the group consisting of a fast-acting linear actuator, a galvanometer type actuator, and a rotary actuator.

12. An image display system, comprising:
a modulator operable to selectively communicate a projection light beam along a projection light path; and
at least one adjustable aperture positioned in the projection light path and operable to selectively vary an amount of the projection light beam communicated from the modulator, the adjustable aperture comprising a notch that operates to reduce the effect of the adjustable aperture on a high intensity light associated with the projection light beam and wherein the notch communicates at least a majority of the high intensity light associated with the projection light beam.

13. The system of claim 12, further comprising:
a control module operable to control a position of the adjustable aperture based at least in part on image data received from a communication device; and
a control motor operable to receive a control signal and to selectively manipulate the adjustable aperture.

14. The system of claim 13, wherein the control motor comprises a trapezoidal voice coil motor capable of transitioning through at least 128 steps in approximately sixteen milliseconds.

15. The system of claim 13, wherein the control motor is selected from the group consisting of a fast-acting linear actuator, a galvanometer type actuator, and a rotary actuator.

16. The system of claim 12, wherein the at least one adjustable aperture selectively varies the amount of the projection light beam based at least in part on image data.

17. The system of claim 16, wherein the image data comprises data selected from a group consisting of an image content of an image frame, a color content of an image frame, an integrated intensity of an image frame, a peak-to-peak intensity value of an image frame, and subjectively weighted area.

18. The system of claim 12, wherein the modulator comprises a device selected from a group consisting of a digital micro-mirror device, a reflective liquid crystal modulator, and a light emitting diode modulator.

19. An adjustable aperture system, comprising:
an adjustable aperture comprising a notch and capable of varying an amount of projection light communicated through the light bundle, wherein the notch operates to reduce the effect of the adjustable aperture on a high intensity light communicated through the light bundle and wherein the notch communicates at least a majority of the high intensity light communicated through the light bundle; and
a control motor operable to receive a control signal.

20. The adjustable aperture system of claim 19, wherein the adjustable aperture includes a scallop section that provides a relatively linear response as the adjustable aperture transitions through the light bundle.

* * * * *